(12) United States Patent
Zamalloa et al.

(10) Patent No.: US 10,366,500 B2
(45) Date of Patent: Jul. 30, 2019

(54) AUTONOMOUS CHARACTERIZATION OF WATER FLOW FROM SURFACE WATER VELOCITY

(71) Applicant: The United States of America, as represented by the Secretary of the Navy, Washington, DC (US)

(72) Inventors: Carlo C. Zuniga Zamalloa, Urbana, IL (US); Blake J. Landry, St. Martinville, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/025,556

(22) Filed: Jul. 2, 2018

(65) Prior Publication Data

US 2019/0005658 A1 Jan. 3, 2019

Related U.S. Application Data

(60) Provisional application No. 62/528,009, filed on Jun. 30, 2017.

(51) Int. Cl.
*G06T 7/246* (2017.01)
*G06K 9/62* (2006.01)
*G06K 9/46* (2006.01)
*H04N 13/15* (2018.01)
*H04N 13/257* (2018.01)
(Continued)

(52) U.S. Cl.
CPC ............ *G06T 7/251* (2017.01); *G06K 9/6276* (2013.01); *G06T 17/05* (2013.01); *H04N 13/15* (2018.05);
(Continued)

(58) Field of Classification Search
CPC .......... G06T 7/246; G06T 2207/10021; G06K 9/4671; G06K 9/6215; G01C 13/002
See application file for complete search history.

(56) References Cited

U.S. PATENT DOCUMENTS 9,269,012 B2 * 2/2016 Fotland ................ G06K 9/3241
2006/0045354 A1 * 3/2006 Hanna ................ G06K 9/00771
382/224

(Continued)

OTHER PUBLICATIONS

Dobson, "Fast, Large-Scale, Particle Image Velocimetry-Based Estimations of River Surface Velocity",Computers & Geosciences 70, pp. 35-43, (2014) (Year: 2014).*

(Continued)

*Primary Examiner* — Jamie J Atala
*Assistant Examiner* — Michael Robert Cammarata
(74) *Attorney, Agent, or Firm* — US Naval Research Laboratory; William P. Ladd

(57) ABSTRACT

Embodiments relate to characterizing a water flow. Initially, a camera targeted at the water flow obtains images. An image pyramid is generated for each image, and a first level of each image pyramid is tiled at an initial scale to identify initial features. The initial features are matched across the first level of the image pyramids at a pixel-level to obtain a first set of feature displacements. A second level of each image pyramid is tiled at a decreased scale to identify a scaled set of features. The scaled features are matched across the second level of the image pyramids at the pixel-level to obtain a second set of feature displacements. Optical flow algorithms are applied to modify each feature displacement to account for a corresponding subpixel registration. A stereo reconstruction is applied to the feature displacements to generate a three dimensional (3D) displacement map.

18 Claims, 6 Drawing Sheets
(2 of 6 Drawing Sheet(s) Filed in Color)

(51) Int. Cl.
*H04N 13/167* (2018.01)
*G06T 17/05* (2011.01)

(52) U.S. Cl.
CPC ......... *H04N 13/167* (2018.05); *H04N 13/257* (2018.05); *G06K 9/4642* (2013.01); *G06K 9/4671* (2013.01); *G06K 9/6215* (2013.01); *G06T 2207/10021* (2013.01); *G06T 2207/30192* (2013.01)

(56) References Cited

U.S. PATENT DOCUMENTS

| | | | |
|---|---|---|---|
| 2009/0195437 A1* | 8/2009 | Barrick | G01C 13/002 342/113 |
| 2009/0324013 A1* | 12/2009 | Tanaka | G06T 7/246 382/103 |
| 2018/0003531 A1* | 1/2018 | Rick | G01S 13/60 |
| 2018/0105236 A1* | 4/2018 | Bhageria | B63B 39/00 |
| 2019/0005656 A1* | 1/2019 | Sanghvi | G06T 7/251 |
| 2019/0078882 A1* | 3/2019 | Agata | G01C 13/00 |

OTHER PUBLICATIONS

Kaab, "Motion Estimation Using Near-Simultaneous Satellite Acquisitions", Remote Sensing of Environment 154, pp. 164-179 (2014) (Year: 2014).*

Creutin, "River Gauging Using PIV Techniques: A Proof of Concept Experiment On The Iowa River", Journal of Hydrology 277, pp. 182-194 (2003). (Year: 2003).*

* cited by examiner

AUTONOMOUS CHARACTERIZATION OF WATER FLOW FROM SURFACE WATER VELOCITY

CROSS-REFERENCE TO RELATED APPLICATIONS

This Application is a non-provisional application claiming priority to provisional application 62/528,009 filed on Jun. 30, 2017, under 35 USC 119(e). The entire disclosure of the provisional application is incorporated herein by reference.

BACKGROUND

Depth estimations in uncharted rivers would enable safe navigation and flood hazard predictions. Measurements of field-scale flows are required for accurately understanding, modeling and predicting the dynamics in riverine and marine environments. Techniques have been developed to accurately capture the field-scale flow measurements for both typical and hazardous flow conditions. For non-hazardous flows (e.g., non-debris flows or flows without large sediment loads), there are several standard techniques for measuring discharge such as turbine flowmeters and ultrasonic profilers. While ultrasonic meters have been developed to provide precise flow measurements, these meters require substantial installation infrastructure and cannot be rapidly placed for time-critical deployments. In addition, the meters cannot be used in hazardous flow conditions (e.g., violent mudslides, flash floods, or debris flows) due to the high risk of damage to any sensors placed in the flow. Also, the range of operation of such equipment (acoustic clarity in the case of ultrasonic profilers) is not designed for such hazardous events. For such extreme conditions, remote sensing flow measurement techniques are required. Particle Image Velocimetry (PIV) is a widely-use, non-contact, image processing laboratory technique which commonly utilizes cross-correlation of consecutive images via Finite Fourier Transform (FFT). Large Scale Particle Image Velocimetry (LSPIV) extends the laboratory technique using FFT to correlate image pairs in field measurements.

LSPIV typically consists of applying the traditional image correlation via Fast Fourier Transform algorithm used in PIV to field applications for measuring surface water flows. PIV itself is a laboratory technique and requires seeding material (e.g., olive oil mist for air flows and glass spheres for water flows) to create a random speckle pattern in the images so that image subregions can be tracked. The cross-correlation of images can be summarized as the process of taking fixed-sized subregions from an image and using it as a template to find the subregions which are most similar in another image.

SUMMARY

Embodiments relate to characterizing a water flow. Initially, a camera targeted at the water flow obtains images. An image pyramid is generated for each image, and a first level of each image pyramid is tiled at an initial scale to identify initial features. The initial features are matched across the first level of the image pyramids at a pixel-level to obtain a first set of feature displacements. A second level of each image pyramid is tiled at a decreased scale to identify a scaled set of features. The scaled features are matched across the second level of the image pyramids at the pixel-level to obtain a second set of feature displacements. Optical flow algorithms are applied to modify each feature displacement to account for a corresponding subpixel registration. A stereo reconstruction is applied to the feature displacements to generate a three dimensional (3D) displacement map.

In embodiments with a single camera, control points on the ground can be used to generate a 2D displacement (i.e. velocity) map in physical units. In embodiments with two or more cameras, a full 3D displacement map can be generated without the need of control points.

BRIEF DESCRIPTION OF THE DRAWINGS

The file of this patent contains at least one drawing executed in color. Copies of this patent with color drawings will be provided by the Patent and Trademark Office upon request and payment of the required fee.

DESCRIPTION

Figure 1A:
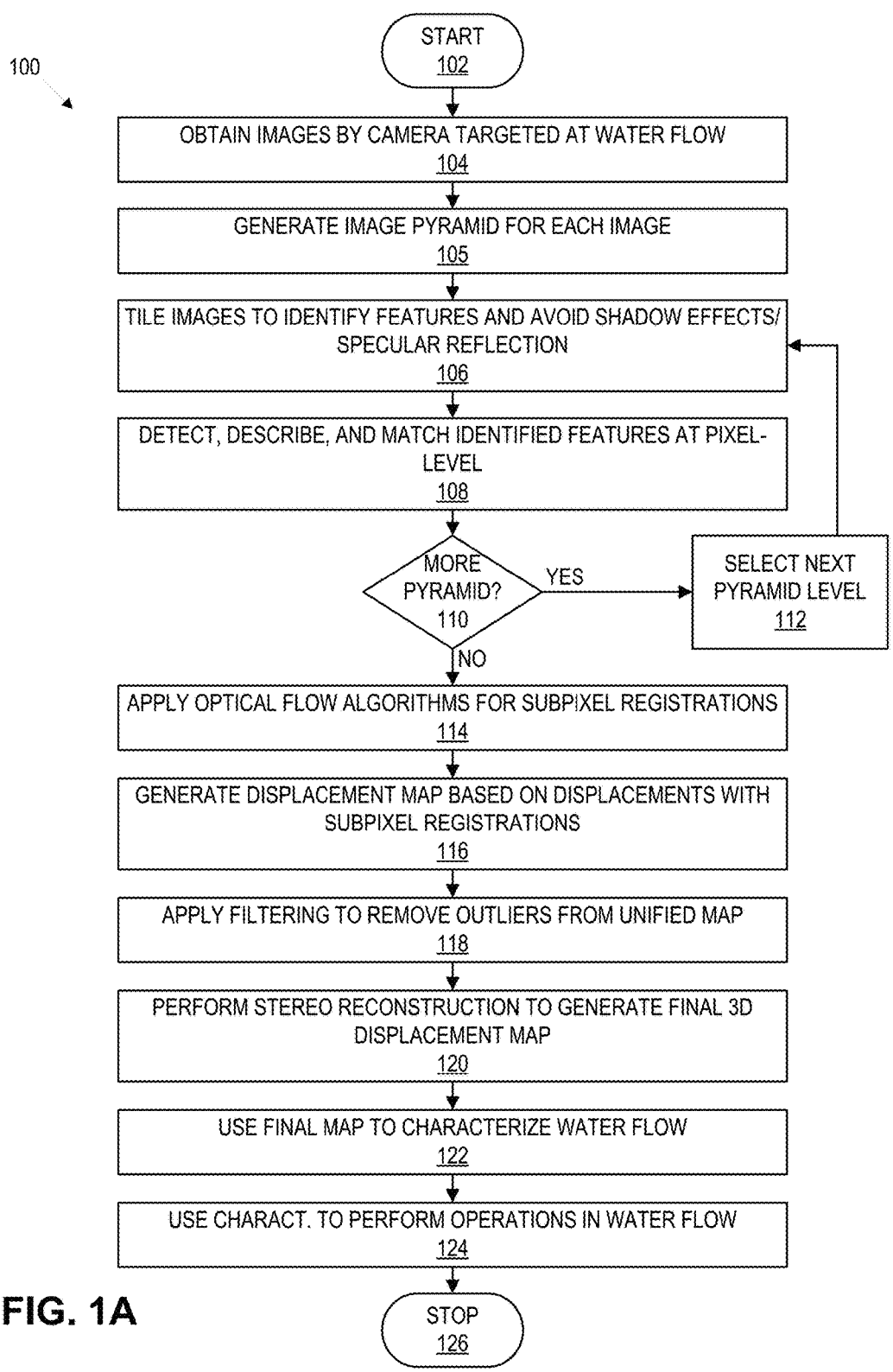
FIGS. 1A and 1B show example workflows for characterizing water flow.

Successful PIV analysis depends on the presence of a random speckle pattern throughout captured field (i.e., local differences in the intensity). In LSPIV studies, adding a seeding material to the flow is usually not a viable or sustainable option. However, the lack of seeding in the flow needed for correlating the images can be overcome by using the color texture obtained from the waves on the surface of the water.

The use of FFT for image correlation is well studied and several implementations are available. Nevertheless, the user input required to set the parameters to properly interrogate the images is demanding, time consuming, and results in a steep learning curve for LSPIV systems. In particular, the proper selection of image subregion sizes is critical since it is a function of the size of the regions to be tracked (e.g., waves) and the amount of displacement that is taking place. To avoid large non-correlatable regions, image masking is often needed. For example, masking is commonly used to remove large portions of water surface that are perceived as large white blobs due to specular reflections from the sun. An objective of the embodiments described herein is to significantly reduce the user input required to obtain the displacement fields from the images by replacing the FFT approach with feature tracking to autonomously find similarities in images.

Feature Matching between images is a topic that has been highly researched in the Computer Vision community. The methodology for Feature Tracking can be divided into two steps. The first step is automatically detecting the trackable regions, which are regions high in color (grayscale) texture. Finding the trackable regions (i.e., features) can be achieved by using one (e.g., Scale-Invariant Feature Transform (SIFT) features) or a combination of many different algorithms (e.g., Harris corner detectors or Features from Accelerated Segment Test (FAST)). Once the features are detected, a descriptor should be assigned to each feature. Several possibilities exist for a descriptor, such as the traditional descriptor for FFT correlation (grayscale map) or more robust descriptors like the SIFT descriptor or the binary robust independent elementary features (BRIEF) descriptor. Finding matching features between images is accomplished by a comparative descriptor metric. This final step can be achieved by finding the inner product of the descriptors for grayscale maps and SIFT descriptors or by taking the Hamming distance in the case of binary descriptors such as BRIEF.

Embodiments herein relate to obtaining a velocity field of a stream surface that requires no user input. Images captured by a camera can be cross-correlated (e.g., features from accelerated segment test (FAST) algorithm) to automatically extract image subregions rich in color texture and detect the trackable regions (i.e., features). Feature matching can be achieved by comparing features (e.g., BRIEF descriptors composed binary strings) along with enhance subpixel displacement detection based on, for example, the Lucas-Kanade optical flow equation. To increase efficiency, a nearest neighbor search is performed to restrict the features compared to only those that are close to each other.

FIG. 1A shows an example workflow 100 for autonomous characterization of water flow from surface water velocity. As is the case with the other processes described herein, various embodiments may not include all of the steps described below, may include additional steps, and may sequence the steps differently. Accordingly, the specific arrangement of steps shown in FIG. 1A should not be construed as limiting the scope of autonomous characterization of water.

Workflow 100 starts at block 102 and then proceeds to block 104, where images are obtained at regular intervals so that a time-series analysis can be performed. In block 105, an image pyramid is generated for each image. The image pyramid can include various levels of images of progressively reduced length-scale. For example, the first level image can be at the original scale, the second level image can be at half the original scale, the third level image can be at quarter the original scale, and so on. Various scale reductions and numbers of levels can be used for the image pyramid.

In block 106, each of the images is tiled. By tiling and normalizing the grey-scale of each image with a heuristically defined length-scale, features can be extracted while significantly suppressing the effect of shadows and steep grey-scale/color gradients, which normally would lead to the detection of a very low number of features. Typical computer vision techniques that extract features from the whole image are particularly ineffective in water flows because water flow features (e.g., ripples) are generally more redundant and less prominent than typical features. The size of the tile can be preconfigured or determined automatically based on the size of the original image. Further, the tile size remains consistent across the different levels of the image pyramid, and the number of levels in the pyramid can be dependent on the tile size (e.g., the last level of the pyramid should have at least four tiles).

In block 108, features are detected, described, matched, and tracked at the pixel-level across the time-series of images. For example, the FAST and BRIEF algorithms can be used to track the features. The tracked features result in displacements (i.e., vectors) that show the magnitude and direction of the features during each time step. In block 110, workflow 100 can determine if there are additional pyramid images to process. In other words, steps 106-108 can be repeated using a scale-space approach to extract additional salient features at various scales. If it is determined that there are more pyramid images to be processed, the next level of the pyramid is selected. At this stage, workflow to can return to block 106 to process the scaled down images.

After all the pyramid images are processed, optical flow algorithms can be applied to the displacements to determine subpixel registrations in block 114. For example, Lucas-Kanade optical flow equations can be applied to obtain subpixel level displacement fields for every scale of the image pyramid. In block 116, 3D displacement maps are generated from the displacements with the subpixel registrations for each pyramid level.

In block 118, a filtering algorithm is applied to remove outliers from a unified 3D displacement map. The unified displacement map can be generated by combining the displacement maps from the different levels of the image pyramid. An example filtering algorithm is described below with respect to FIG. 1B. In block 120, stereo reconstruction is performed to combine the unified displacement maps from different cameras into a final 3D displacement map. Alternatively, for single camera systems, the 3D reconstruction can be performed by using geo-referenced control points and a homography to convert from pixels to physical units.

In block 122, the final 3D displacement map can be used to characterize the water flow. For example, the final 3D displacement map can be used to identify currents in coastal waters. In another example, the final 3D displacement map can be used to determine discharge of a river flow. In block 124, the water flow characterizations can be perform operations (e.g., vessel navigation, unmanned underwater vehicle (UUV) remote operation, deployment of sensor devices, etc.) in the water flow.

Figure 1B:
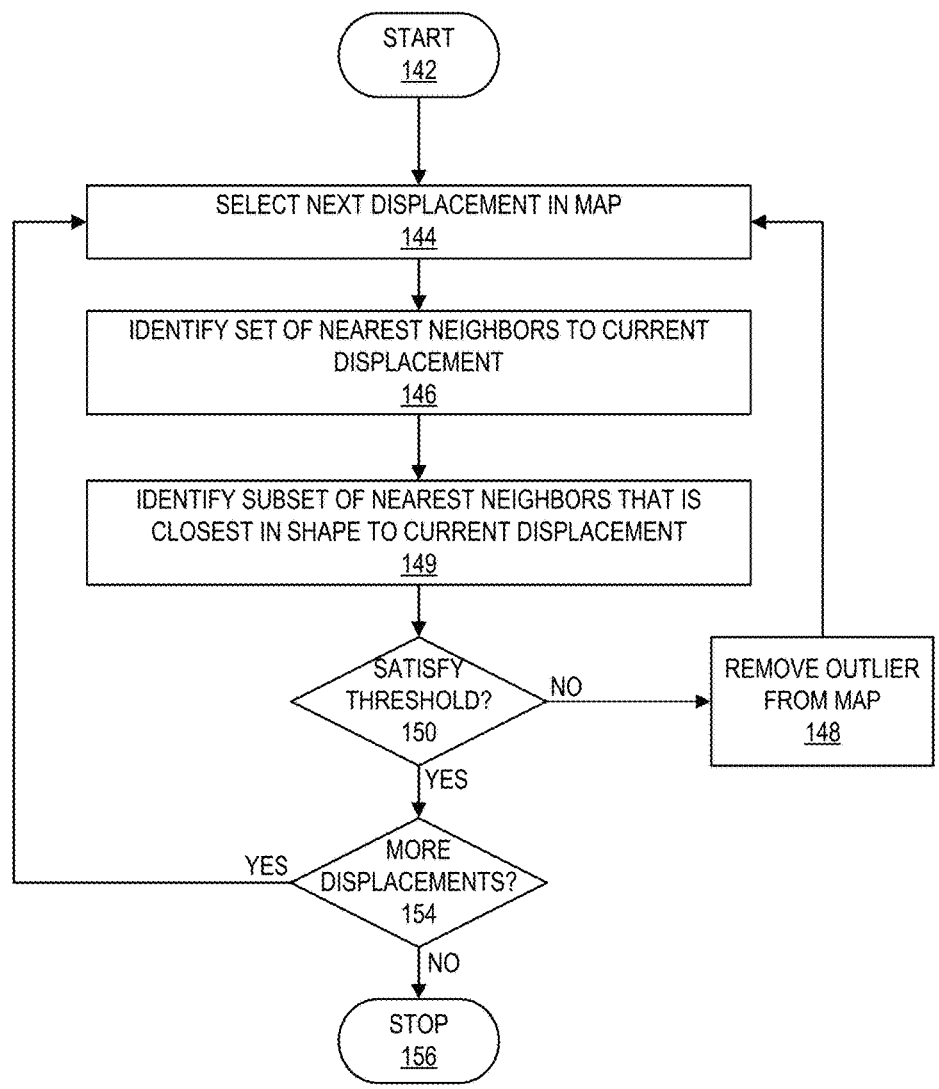

FIG. 1B shows an example workflow 118 for removing outliers from a 3D displacement map. The specific arrangement of steps shown in FIG. 1B should not be construed as limiting the scope of removing outliers.

Workflow 118 can be applied to a unified displacement map generated from the pyramid images. Workflow 118 starts in block 142 and then proceeds to block 144, where the next displacement in a displacement map is selected. In block 146, an initial set of nearest neighbors of the current displacement is identified. The number of nearest neighbors in the initial set can be configured to optimize performance and/or accuracy. In one example, the initial set is determined by selecting the specified number of nearest neighbors.

In block 149, a subset of the nearest neighbors that are closest in shape to the current displacement is identified. In an example where the initial set has six nearest neighbors, two neighboring displacements that are the most similar to the current displacement can be included in the subset. The shape of displacements can be compared by comparing their magnitude and direction. For example, the inner product of the current displacement with each one of displacements in the initial subset can be calculated and then normalized with the magnitude of the current displacement. In this example, the normalized inner products that are closest to one would be the most similar.

In block 150, a determination is made as to whether the displacements in the subset satisfy a threshold requirement. Continuing the above example, a displacement in the subset satisfies the threshold if absolute value of 1—the normalized inner product is less than a specified threshold (e.g., 0.4). If the displacements in subset do not satisfy the threshold, the current displacement is removed from the 3D displacement map in block 148 and then workflow 118 returns to block 144 to process the next displacement.

If the displacements in the subset do satisfy the threshold, the current displacement is maintained in the 3D displacement map and workflow 118 proceeds to block 154, where a determination is made as to whether there are more displacements in the displacement map to process. If there are more displacements to process, workflow 118 returns to block 144 to process the next displacement.

Optionally, the median distance between all features in the image can be used to handle features with a sparse number of neighbors. In this case, the median distance is used to identify nearest neighbors for the initial set, where the displacement can be removed as an outlier if the initial set does not include a sufficient number of candidates.

Figure 2:
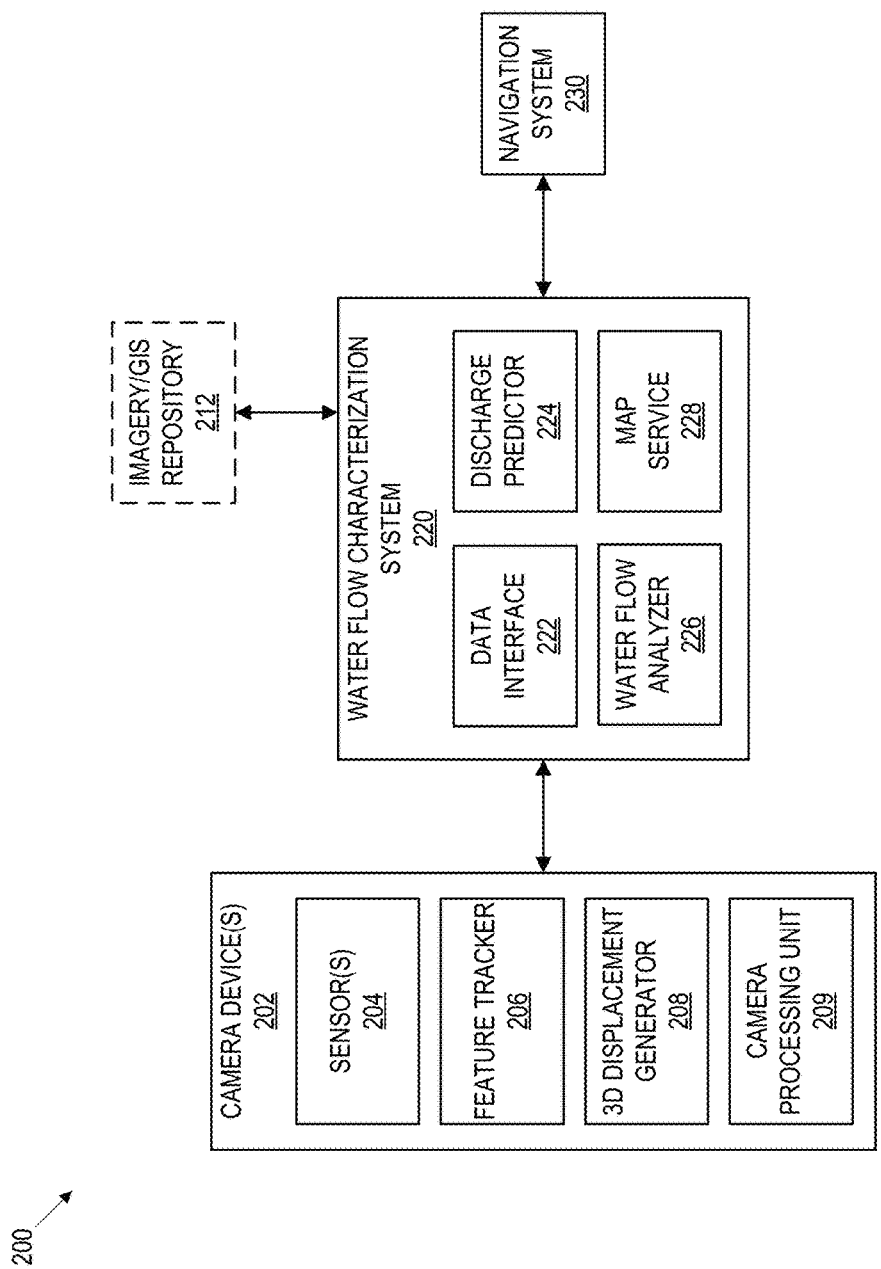
FIG. 2 shows an example system for characterizing water flow.

FIG. 2 shows an example system 200 for autonomous characterization of water flow from surface water velocity. The system 200 includes camera device(s) 202, a water flow characterization system 220, and a navigation system 230. Optionally, the system 200 can also an imagery/geographic information system (GIS) repository 212.

Camera device(s) 202 are configured to capture images of a water flow. Camera device(s) include sensor(s) 204, a feature tracker 206, and a 3D displacement generator 208. In some cases, camera device(s) 202 can be mounted to a stationary object (e.g., bridge, sensor station, etc.) aimed at a water flow. In other cases, camera device(s) 202 can be mounted to a vehicle (e.g., unmanned aerial vehicle (UAV), water vessel, etc.). The camera device(s) 202 are configured differently depending on their number.

For two or more camera devices 202, the camera devices 202 are calibrated to synchronize their views, where the views are synchronized based on the zoom, relative distance, relative angle, etc. of each of the camera devices 202. For a single camera device 202, the 3D displacement generator 208 is configured to perform 3D stereo construction by using geo-referenced points and a homography.

Sensor(s) 204 can include various image sensors for capturing high-resolution images. The sensor(s) 204 can be configured to capture the images at various time intervals. Feature tracker 206 is configured to identify and track features as described above with respect to FIG. 1S. Specifically, feature tracker 206 can be configured to use, for example, the FAST and BRIEF algorithms to generate feature related data. Feature tracker 206 can automatically identify features by using image pyramid processing.

Feature tracker 206 uses a similar approach to the ORB (Oriented FAST and rotated BRIEF) algorithm, which uses the FAST algorithm to rapidly detect the feature candidates and the BRIEF algorithm to describe and efficiently match the features by using the Hamming distance. Feature tracker 206 achieves scale invariance in ORB by using an image pyramid scheme, and the robustness of the feature extraction is relaxed by removing the Harris filtering step of ORB. Feature tracker 206 also uses two additional steps to increase accuracy and efficiency. First, a nearest neighbor search is used when comparing other features that are close to the feature being matched. Traditional feature matching takes a feature in one image and compares it to all features in the other image to find the best match. The traditional image-wide feature matching is costly since the time for searching for matches approximately scales as the square of the number of features. For the flow velocimetry application, image-wide feature comparison is unnecessary since only the nearest neighbors are candidates for a match. Second, the displacements maps are updated to include subpixel registration. The original ORB algorithm can only match or track features at a pixel level, which limits accurate velocity field estimates. Traditional subpixel techniques used in feature tracking take the pixel location of an image feature and optimize the location at subpixel level using the information of that single feature. For example, to detect and enhance subpixel displacements for velocimetry applications, the Lucas-Kanade optical flow equation can be applied to the pixel level feature displacements, where the flow equation uses the information of two features to determine the subpixel displacement.

3D displacement generator 208 is configured to generate displacement maps as described above with respect to FIG. 1A. After the displacement maps are generated, 3D displacement generator 208 can provide the displacement maps to the water flow characterization system 220.

The aforementioned components 204, 206, 28 of camera device(s) 202 are controlled by a camera processing unit 208. The camera processing unit 208 can be various computing devices (e.g., raspberry pi, laptop computer, etc.). The algorithms described above in FIGS. 1A and 1B can be optimized to execute effectively on the target computing device. For example, the tile size for feature identification can be increased to improve performance. In another example, the size of the candidate set of analyzing outliers can be increased to improve accuracy.

Imagery/GIS repository 212 can be a database, distributed database, data storage device, combination thereof, etc. that is configured to store spatial data and/or imagery. The spatial data can include, but is not limited to, shorelines, GIS data files such as a geodatabase or a shapefile, etc. The imagery can include, but is not limited to, airborne infrared imagery, satellite-borne multispectral imagery, etc.

Water flow characterization system 220 includes data interface 222, discharge predictor 224, water flow analyzer 226, and map service 228. The data interface 222 receives data from the camera device(s) 202 and the imagery/GIS repository 212. In some cases, the data interface 222 can be configured to receive the data directly from the sensor or repository via a wired or wireless protocol. In other cases, the data interface 222 can be configured to receive the data indirectly such as through an intermediate database, physically transported data files that are collected at the location of the sensors, etc.

Discharge predictor 224 predicts discharge values based on displacement maps and depth data of the water flow. The depth data can be obtained from real-time depth sensors and/or the imagery/GIS repository 212. Specifically, the 3D displacement maps from the camera device(s) 202 can used to characterize the flow of water through a 3D model of the bottom of a river section.

Water flow analyzer 226 can identify currents in a water flow based on the 3D displacement maps. For example, the 3D displacement maps can be used to identify rip currents in coastal waters. In this example, consistent one-way displacements in the 3D displacement maps can be recognized as rip currents.

Map service 228 performs GIS functions for the water flow characterization system 220. For example, map service 228 can generate a river map based on the discharge values and 3D displacement maps. In another example, map service 228 can generate a coastline map based on identified currents and 3D displacement maps. Map service 228 can also allow a user to interact with the maps so that it can be modified, rendered on a display, interfaced with a navigation system 230, etc.

Navigation component 230 is used to control the navigation of a watercraft. For example, navigation component 230 may use the water flow characterization to assist a user in avoiding collisions while navigating the watercraft at the river location. In another example, the navigation component 230 can track the current location of the watercraft so that the watercraft location as determined by a global positioning system (GPS) can be rendered in a 3D model of the water flow characterization. In this case, the determined discharge and currents can used in the 3D model to identify/display hazards that are proximate to the watercraft location as it is updated in real-time.

Figure 3:
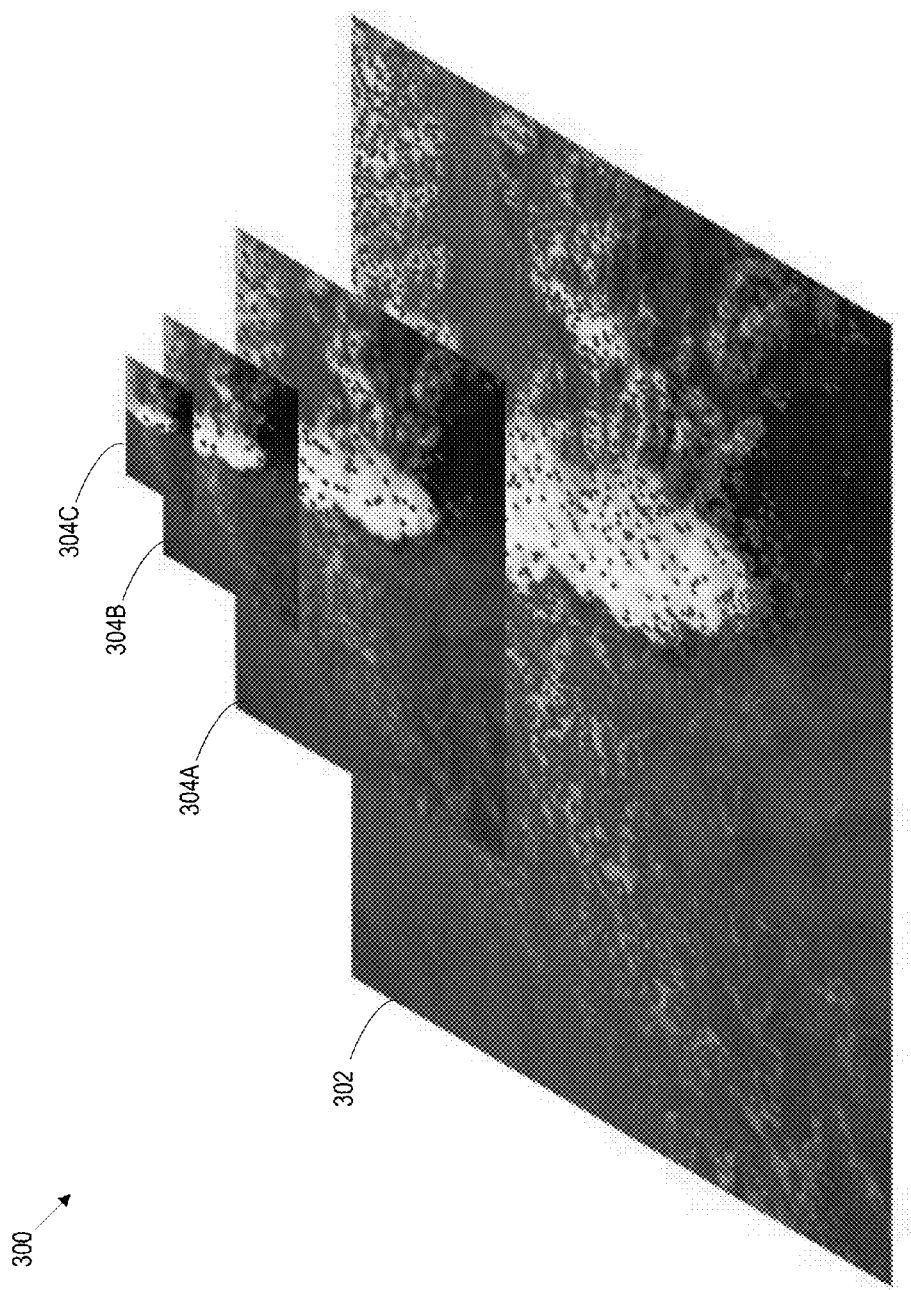
FIG. 3 shows an example image pyramid for feature tracking.

FIG. 3 shows an example image pyramid 300 for feature tracking. The original image 302 at the original scale shows the displacements determined as described in FIGS. 1A and 1B in red. Similarly, each of the scaled down images 304A-304C shows their corresponding displacements in red. Each of the scaled down images 304A-304C has different displacements than the original image 302 because there is a visual quality loss when the images 304A-304C are the scaled down.

Typical feature tracking algorithms are too discriminant and would result in far less potential features when applied to the shown surface image 302. Because the feature tracking described in FIG. 1A is less discriminant, the robust outlier algorithm described in FIG. 1B is used to remove outliers from the final displacement map.

Figure 4:
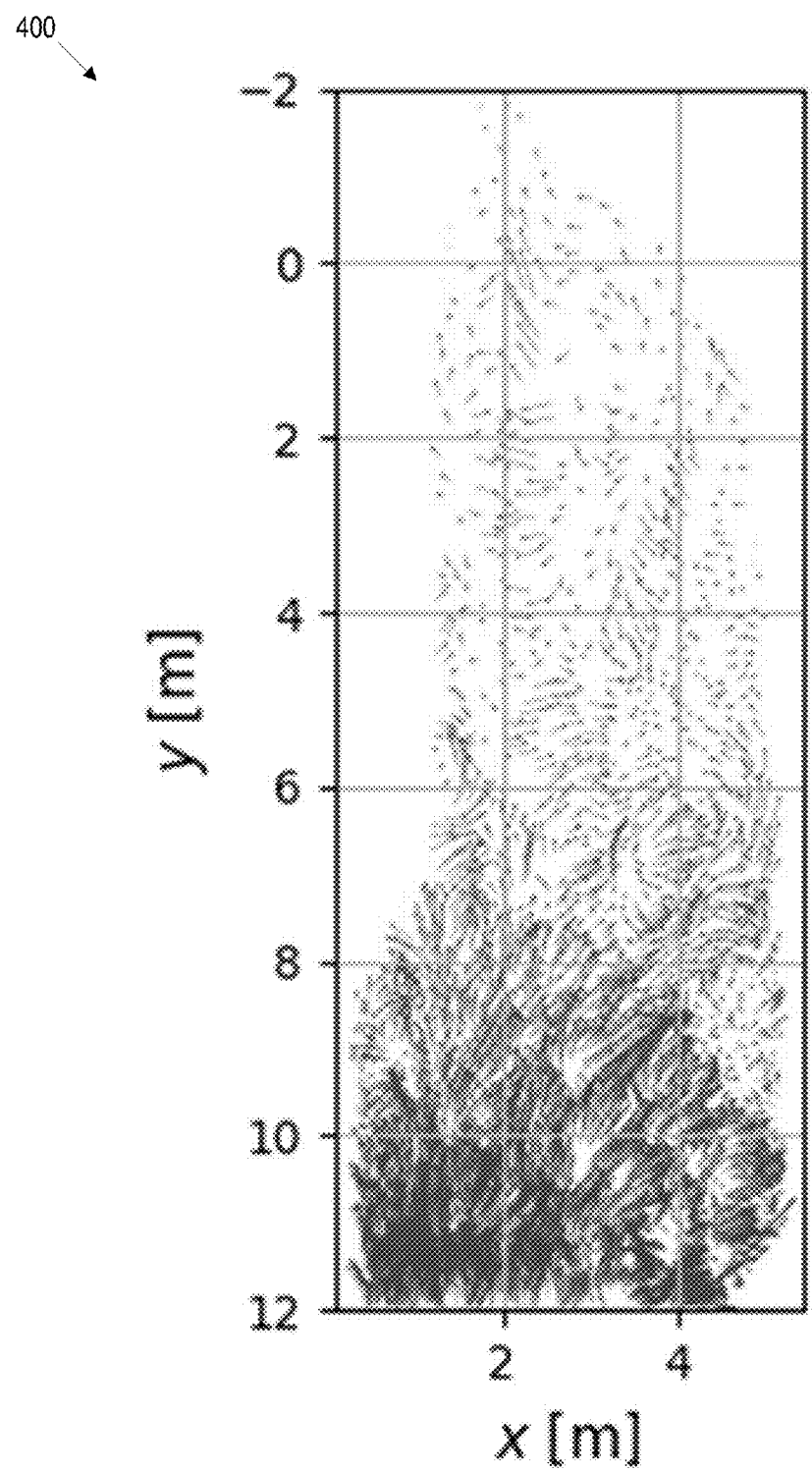
FIG. 4 shows an example dewarped field for use by a single camera system.

FIG. 4 shows an example dewarped field 400 for use by a single camera system. The dewarped field 400 of a river section allows for 3D displacements to be determined from imagery of a single camera. Once the displacement field is obtained, the field is dewarped to convert displacement values from pixel to physical units (e.g., pixels to meters). A homography matrix can then be constructed by mapping control points that are close to the surface of the water to their corresponding pixel locations in the image. The homography matrix is applied to map all the displacements from pixel locations to corresponding physical locations.

Figure 5:
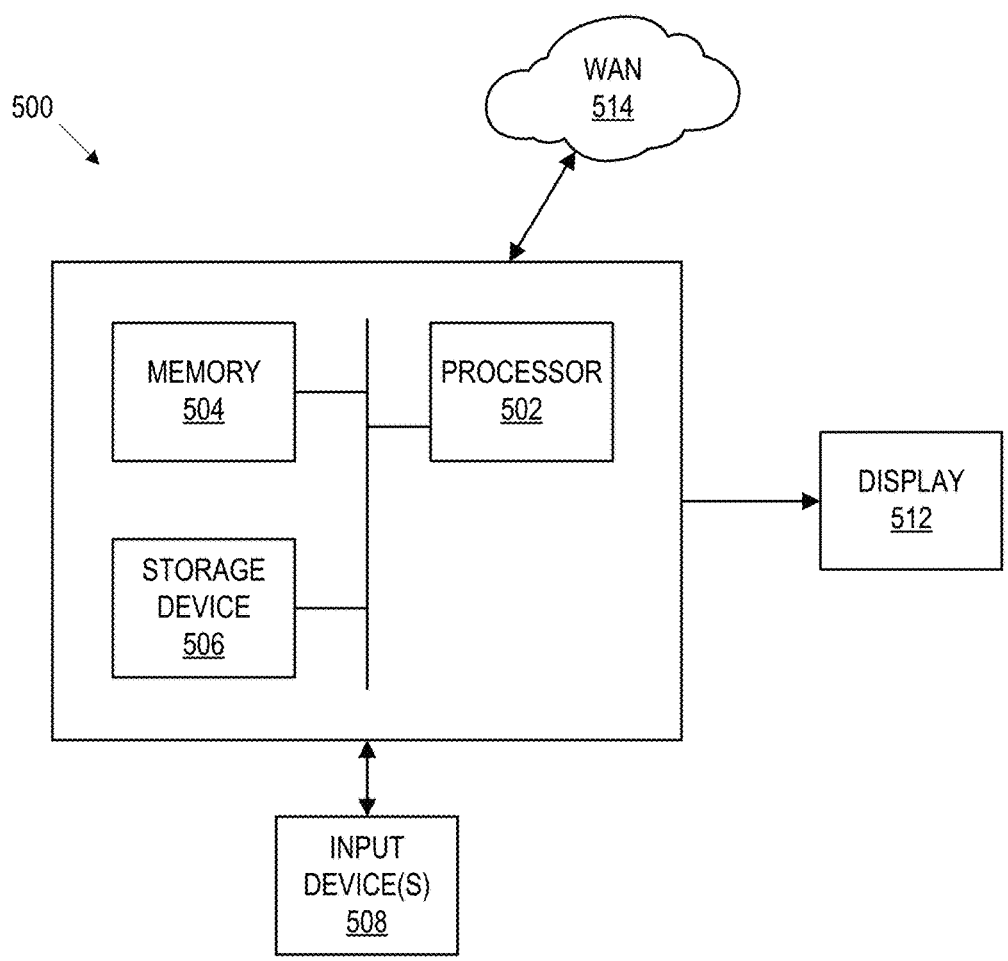
FIG. 5 shows a diagram of an example computer system for executing a water flow characterization system.

The invention may be implemented on virtually any type of computer regardless of the platform being used. For example, as shown in FIG. 5, a computer system 500 includes a processor 502, associated memory 504, a storage device 506, and numerous other elements and functionalities typical of today's computers (not shown). The computer 500 may also include input means 508, such as a keyboard and a mouse, and output means 512, such as a monitor. The computer system 500 may be connected to a local area network (LAN) or a wide area network (e.g., the Internet) 514 via a network interface connection (not shown). Those skilled in the art will appreciate that these input and output means may take other forms.

Further, those skilled in the art will appreciate that one or more elements of the aforementioned computer system 500 may be located at a remote location and connected to the other elements over a network. Further, the invention may be implemented on a distributed system having a plurality of nodes, where each portion of the invention (e.g., water flow characterization system, navigation system, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for characterizing a water flow, the method comprising:
   obtaining a plurality of images by a camera targeted at the water flow;
   generating an image pyramid for each of the plurality of images;
   tiling a first level of each of the plurality of image pyramids at an initial scale to identify an initial plurality of features;
   matching the initial plurality of features across the first level of the plurality of image pyramids at a pixel-level to obtain a first plurality of feature displacements;
   tiling a second level of each of the plurality of image pyramids at a decreased scale to identify a scaled plurality of features, wherein the decreased scale is less than the initial scale;
   matching the scaled plurality of features across the second level of the plurality of image pyramids at the pixel-level to obtain a second plurality of feature displacements;
   applying optical flow algorithms to modify each of the first and second plurality of feature displacements to account for a corresponding subpixel registration;
   applying stereo reconstruction to a unified displacement map that comprises the first and second plurality of feature displacements to generate a three dimensional (3D) displacement map;
   using the 3D displacement map to characterize the water flow; and
   performing aquatic operations in the water flow based on the characterization of the water flow.

2. The method of claim 1, further comprising:
   applying a nearest neighbor algorithm to each feature in the unified displacement map to remove a corresponding plurality of outlier displacements, wherein each outlier displacement of the plurality of outlier feature displacements has less than a minimum number of similar neighbors that are within a magnitude threshold and a direction threshold of the outlier displacement.

3. The method of claim 2, wherein applying the nearest neighbor algorithm further comprises:
   for each displacement in the unified displacement map:
   identifying a set of nearest neighbors in the unified displacement map that are within a preconfigured distance of the displacement;
   selecting a subset from the set that includes displacements most similar in magnitude and direction to the displacement; and
   removing the displacement from the unified displacement map in response to any of the similar displacements failing to satisfy a magnitude and direction threshold.

4. The method of claim 3, wherein selecting the subset further comprises:
   determining an inner product of the displacement with each neighbor displacement in the set of nearest neighbors; and
   selecting a specified number of the neighbor displacements that have a corresponding inner product closest to 1 to be included in the subset as the similar displacements,
   wherein any of the similar displacements fails to satisfy the magnitude and direction threshold when an absolute value of a corresponding inner product is greater than the magnitude and direction threshold.

5. The method of claim 1, wherein the water flow characterization comprises river discharge, and wherein the aquatic operations comprises navigating a water vessel in the water flow.

6. The method of claim 1, wherein the water flow characterization comprises a plurality of identified currents, and wherein the aquatic operations comprises releasing an object in the water flow such that the plurality of currents carry the object to a target destination.

7. A system for characterizing a water flow comprising:
a first camera device with a first view of the water flow;
a second camera device with a second view of the water flow, the first and second cameras being calibrated to synchronize the first view with the second view, and the first and second cameras to obtain a plurality of images;
a feature tracker to:
generate an image pyramid for each of the plurality of images;
tile a first level of each of the plurality of image pyramids at an initial scale to identify an initial plurality of features;
match the initial plurality of features across the first level of the plurality of image pyramids at a pixel-level to obtain a first plurality of feature displacements;
tile a second level of each of the plurality of image pyramids at a decreased scale to identify a scaled plurality of features, wherein the decreased scale is less than the initial scale;
match the scaled plurality of features across the second level of the plurality of image pyramids at the pixel-level to obtain a second plurality of feature displacements; and
apply optical flow algorithms to modify each of the first and second plurality of feature displacements to account for a corresponding subpixel registration; and
a three dimensional (3D) displacement generator to apply stereo reconstruction to a unified displacement map that comprises the first and second plurality of feature displacements to generate a 3D displacement map.

8. The system of claim 7, wherein the feature tracker is further to apply a nearest neighbor algorithm to each feature in the unified displacement map to remove a corresponding plurality of outlier displacements, wherein each outlier displacement of the plurality of outlier feature displacements has less than a minimum number of similar neighbors that are within a magnitude threshold and a direction threshold of the outlier displacement.

9. The system of claim 8, wherein applying the nearest neighbor algorithm further comprises:
for each displacement in the unified displacement map:
identifying a set of nearest neighbors in the unified displacement map that are within a preconfigured distance of the displacement;
selecting a subset from the set that includes displacements most similar in magnitude and direction to the displacement; and
removing the displacement from the unified displacement map in response to any of the similar displacements failing to satisfy a magnitude and direction threshold.

10. The system of claim 9, wherein selecting the subset further comprises:
determining an inner product of the displacement with each neighbor displacement in the set of nearest neighbors; and
selecting a specified number of the neighbor displacements that have a corresponding inner product closest to 1 to be included in the subset as the similar displacements,
wherein any of the similar displacements fails to satisfy the magnitude and direction threshold when an absolute value of a corresponding inner product is greater than the magnitude and direction threshold.

11. The system of claim 7, further comprising a water flow characterization device to use the 3D displacement map to characterize the water flow.

12. The system of claim 11, further comprising a navigation device to position a water vessel in the water flow based on the characterization.

13. A non-transitory computer readable medium comprising computer code for characterizing a water flow, the computer code, when executed by a processor, performing steps to:
obtain a plurality of images by a camera targeted at the water flow;
generate an image pyramid for each of the plurality of images;
tile a first level of each of the plurality of image pyramids at an initial scale to identify an initial plurality of features;
match the initial plurality of features across the first level of the plurality of image pyramids at a pixel-level to obtain a first plurality of feature displacements;
tile a second level of each of the plurality of image pyramids at a decreased scale to identify a scaled plurality of features, wherein the decreased scale is less than the initial scale;
match the scaled plurality of features across the second level of the plurality of image pyramids at the pixel-level to obtain a second plurality of feature displacements;
apply optical flow algorithms to modify each of the first and second plurality of feature displacements to account for a corresponding subpixel registration;
apply stereo reconstruction to a unified displacement map that comprises the first and second plurality of feature displacements to generate a three dimensional (3D) displacement map; and
use the 3D displacement map to characterize the water flow, wherein aquatic operations are performed in the water flow based on the characterization of the water flow.

14. The non-transitory computer readable medium of claim 13, wherein the computer code when executed further performs steps to:
apply a nearest neighbor algorithm to each feature in the unified displacement map to remove a corresponding plurality of outlier displacements, wherein each outlier displacement of the plurality of outlier feature displacements has less than a minimum number of similar neighbors that are within a magnitude threshold and a direction threshold of the outlier displacement.

15. The non-transitory computer readable medium of claim 14, wherein applying the nearest neighbor algorithm further comprises:
for each displacement in each of the unified displacement map:
identifying a set of nearest neighbors in the unified displacement map that are within a preconfigured distance of the displacement;

selecting a subset from the set that includes displacements most similar in magnitude and direction to the displacement; and removing the displacement from the unified displacement map in response to any of the similar displacements failing to satisfy a magnitude and direction threshold.

16. The non-transitory computer readable medium of claim 15, wherein selecting the subset further comprises:

determining an inner product of the displacement with each neighbor displacement in the set of nearest neighbors; and selecting a specified number of the neighbor displacements that have a corresponding inner product closest to 1 to be included in the subset as the similar displacements, wherein any of the similar displacements fails to satisfy the magnitude and direction threshold when an absolute value of a corresponding inner product is greater than the magnitude and direction threshold.

17. The non-transitory computer readable medium of claim 13, wherein the water flow characterization comprises river discharge, and wherein the aquatic operations comprises navigating a water vessel in the water flow.

18. The non-transitory computer readable medium of claim 13, wherein the water flow characterization comprises a plurality of identified currents, and wherein the aquatic operations comprises releasing an object in the water flow such that the plurality of currents carry the object to a target destination.

* * * * *